US007031351B2

United States Patent
Jeon

(10) Patent No.: US 7,031,351 B2
(45) Date of Patent: Apr. 18, 2006

(54) SERIAL DATA MAPPING APPARATUS FOR SYNCHRONOUS DIGITAL HIERARCHY

(75) Inventor: Ki Yong Jeon, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 891 days.

(21) Appl. No.: 09/939,627

(22) Filed: Aug. 28, 2001

(65) Prior Publication Data

US 2002/0026568 A1    Feb. 28, 2002

(30) Foreign Application Priority Data

Aug. 28, 2000   (KR) .............................. 2000-49973

(51) Int. Cl.
*H04J 3/02* (2006.01)
(52) U.S. Cl. ...................... 370/539; 370/466; 370/535; 370/536
(58) Field of Classification Search ................ 370/535, 370/536, 539, 541, 412, 428, 429, 465, 466, 370/473, 474, 503
See application file for complete search history.

(56) References Cited

U.S. PATENT DOCUMENTS

| 5,933,432 A | * | 8/1999 | Ha et al. ..................... 370/505 |
| 6,285,673 B1 | * | 9/2001 | Blackburn et al. .......... 370/360 |
| 6,584,118 B1 | * | 6/2003 | Russell et al. ............... 370/466 |
| 6,628,651 B1 | * | 9/2003 | Ryan et al. .................. 370/369 |
| 2002/0159473 A1 | * | 10/2002 | Roberts et al. ............. 370/442 |

* cited by examiner

*Primary Examiner*—Ricky Q. Ngo
*Assistant Examiner*—Nguyen H. Ngo
(74) *Attorney, Agent, or Firm*—Fleshner & Kim, LLP

(57) ABSTRACT

Disclosed is a serial data mapping apparatus and method for mapping DS serial data into VC parallel data which includes an STM-1 address generating unit for generating a mapping address; a VC mapping unit for mapping a DS asynchronous signal into a VC signal as byte unit, according to the mapping address; and an STM-1 formatting unit for pointer processing and multiplexing a virtual container of the mapped VC signal and generating an STM-1 signal.

14 Claims, 4 Drawing Sheets

SERIAL DATA MAPPING APPARATUS FOR SYNCHRONOUS DIGITAL HIERARCHY

BACKGROUND OF THE INVENTION

1. Field of the Invention

The present invention relates to a mapping apparatus, and, more particularly, to an apparatus for mapping DS serial data to VC parallel data.

2. Background of the Related Art

Generally, a synchronous digital hierarchy (SDH) system performs a mapping operation for an asynchronous signal according to an ITU-T recommendation. That is, the SDH system performs mapping and pointer processing of the asynchronous signal in a virtual container. After the mapping and processing are complete, the SDH system multiplexes the signal to form a synchronous transmission module STM-1 signal. Therefore, in order to transmit a certain asynchronous signal through the SDH system, a series of processes for changing the corresponding asynchronous signal to an STM-n signal should be performed.

FIG. 1 is a block diagram showing a general SDH system. A plurality of VC11/12 virtual containers (11A–11C) map the asynchronous signals DS-1 and DS-1 E as VC11/12 signals, in a manner determined by control signals J1, mj1, and Plden of an STM-1 counter 15. In addition, a tributary unit group (TUG) circuit (not shown) attaches a path overhead (POH) and a pointer on the VC11/12 signal, which is mapped in the VC11/12 virtual containers 11A–11C, and arranges them as Tributary Unit (TU) signals. After that, the TUG circuit multiplexes the arranged TU signals by a ratio of 1:7 and outputs the TUG signal.

A VC3/4 mapping unit 12A receives the multiplexed TUG signal and the asynchronous signals DS-3, DS3E, and DS4 and maps them as VC3/4 signals, according to address signals J1 and mj1 of the STM-1 counter. VC3/4 mapping units 12B and 12C receive the multiplexed TUG signals and the asynchronous signals DS-3 and DS3E and map them as the VC3 signal, according to address signals J1 and mj1 of the STM-1 counter 15. Address signals J1 and mj1 designate the positions where the asynchronous signals are mapped.

Therefore, an AUG3/4 pointer generating unit 13 pointer processes the VC3 signal and the VC4 signal and outputs the administration unit signals AU3 and AU4. An AU signal mapper 14 multiplexes the AU3 and AU4 signals, output from the AUG3/4 pointer generating unit 13, to form an STM-1 signal.

As described above, in the series of processes for receiving the asynchronous signals and generating the STM-1 signal, the mapping operations of the VC11/12 virtual container 11A–11C are performed by a buffer disposed as a channel unit, and by a controlling signal inputted into the buffer, as shown in FIG. 2.

FIG. 2 is a detailed block diagram showing respective VC11/12 virtual containers 11A–11C. The VC11/12 virtual containers 11A–11C comprise: an elastic buffer 21 for temporarily storing the asynchronous signals DS-1 and DS-1 E, that is, serial data; a serial/parallel changing unit 22 for changing the serial asynchronous data Sd read from the elastic buffer 21 into parallel asynchronous data Pd; a VC1 mapper 23 for multiplexing the parallel asynchronous signal Pd changed in the serial/parallel changing unit 22, and for outputting VC1/VC12 signals; a VC1 framer 24 fcr controlling the multiplexing operation of the VC1 mapper 23; a write pointer generating unit 25 for generating a write address (WA) of the elastic buffer 21; and a read pointer generating unit 26 for generating a read address (RA) of the elastic buffer 21. The ien and Spen are enable signals of the read pointer generating unit 26 and the serial/parallel changing unit 22, respectively.

When a 1.544 MHz DS-1 signal or a 2.048 MHz DS-1 E signal is inputted, the elastic buffer 21 disposed in the respective channel stores the inputted asynchronous DS-1 or DS-1E signal on a position, which the write address WA of the write pointer generating unit 25 sets.

The VC1 framer 24 is inputted the address signal J1 and mj1 from the STM-1 counter 15 and outputs the enable signals ien and Spen to the read pointer generating unit 26 and to the serial/parallel changing unit 22. Also, the VC1 framer 24 generates mapping control signals V5t, J2t, N2t, and K4t indicating the positions on which the new serial asynchronous signals are mapped. Additionally, the VC1 framer 24 generates the control signals J2dt (8:0), Psr, and Nsr indicating the positions on which the data/null data are inserted periodically.

The read pointer generating unit 26 outputs the read address RA according to the enable signal ien outputted from the VC1 framer 24, and the elastic buffer 21 outputs serial asynchronous signal Sd to the serial/parallel changing unit 22, according to the read address RA. The VC1 framer 24 monitors the difference between the write address WA and the read address RA, and controls the data reading speed by controlling the clock number of the enable signal ien.

Therefore, the serial asynchronous signal Sd read in the elastic buffer 21 is changed into parallel data Pd in the serial/parallel changing unit 22. The VC1 mapper 23 multiplexes the parallel asynchronous signal Pd, changed in the serial/parallel changing unit 22, and outputs VC11/VC12 signal according to the mapping controlling signals V5t, J2t, K4t, J2dt (8:0), Psr and Nsr outputted from the VC1 framer 24.

However, the background art SDH system processes the asynchronous signal by including the elastic buffer 21, the write pointer generating unit 25 the read pointer generating unit 26 and the serial/parallel changing unit 22 in a respective channel. Therefore, as shown in FIG. 1, if the background art SDH system processes 84 channels of DS-1 signals, it needs 84 write pointer generating units, read pointer generating units, and serial/parallel changing units, respectively. In addition, in the background art SDH system, the number of gates needed to implement the respective channels are increased in the case of a multiple channel embodiment, whereby the system structure is complex.

Also, the background art SDH system performs write and read operations of the elastic buffer using the clock signal of the asynchronous signal and the system clock signal, respectively, which are not synchronized with each other. The lack of synchronization creates a system jitter.

SUMMARY OF THE INVENTION

An object of the invention is to solve at least the above problems and/or disadvantages and to provide at least the advantages described hereinafter.

Therefore, an object of the present invention is to provide a data mapping apparatus for synchronous digital hierarchy system by which mapping operations of multiple channels are performed effectively using the least number of gates.

To achieve the object of the present invention, as embodied and broadly described herein, there is provided a serial data mapping apparatus for an SDH system comprising: a STM-1 address generating unit for generating a mapping address; a VC mapping unit for mapping DS asynchronous signal into VC signal as a byte unit according to the mapping address; and an STM-1 formatting unit for generating an STM-1 signal by pointer processing and multiplexing a virtual container of the mapped VC signal.

The respective VC mapping unit comprises: a plurality of elastic buffers for writing the DS asynchronous signal as a bit unit, and reading the signal as a byte unit; a write pointer generating unit for generating write addresses of respective elastic buffers; a read pointer controlling unit for generating read addresses of respective elastic buffers; a VC1 mapper for multiplexing the parallel asynchronous data of the byte unit read in the respective elastic buffer as VC signals according to a format controlling signal; a VC1 framer identifying mapping position of the asynchronous signal according to a format address signal outputted from the STM-1 address generating unit, and controlling the elastic buffer, the read pointer generating unit, and the VC1 mapper according to the identified mapping position.

The objects of the present invention can be achieved in whole or in part by a serial data mapping apparatus, including a plurality of elastic buffers that each receive serial asynchronous data, store the received asynchronous data, and simultaneously output a number of parallel data bits of the asynchronous data in a multiple bit unit; and a virtual container mapping unit that receives the multiple bit unit from the elastic buffer and maps the multiple bit unit to a virtual container signal.

The objects of the present invention can be further achieved in whole or in part by a method of mapping serial data mapping, including receiving each of a plurality of serial asynchronous data signals into a plurality of elastic buffers, respectively; multiplexing multiple bit data units simultaneously read from the plurality of elastic buffers into a virtual container signal; and generating an STM-1 signal from the vitLtual container signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
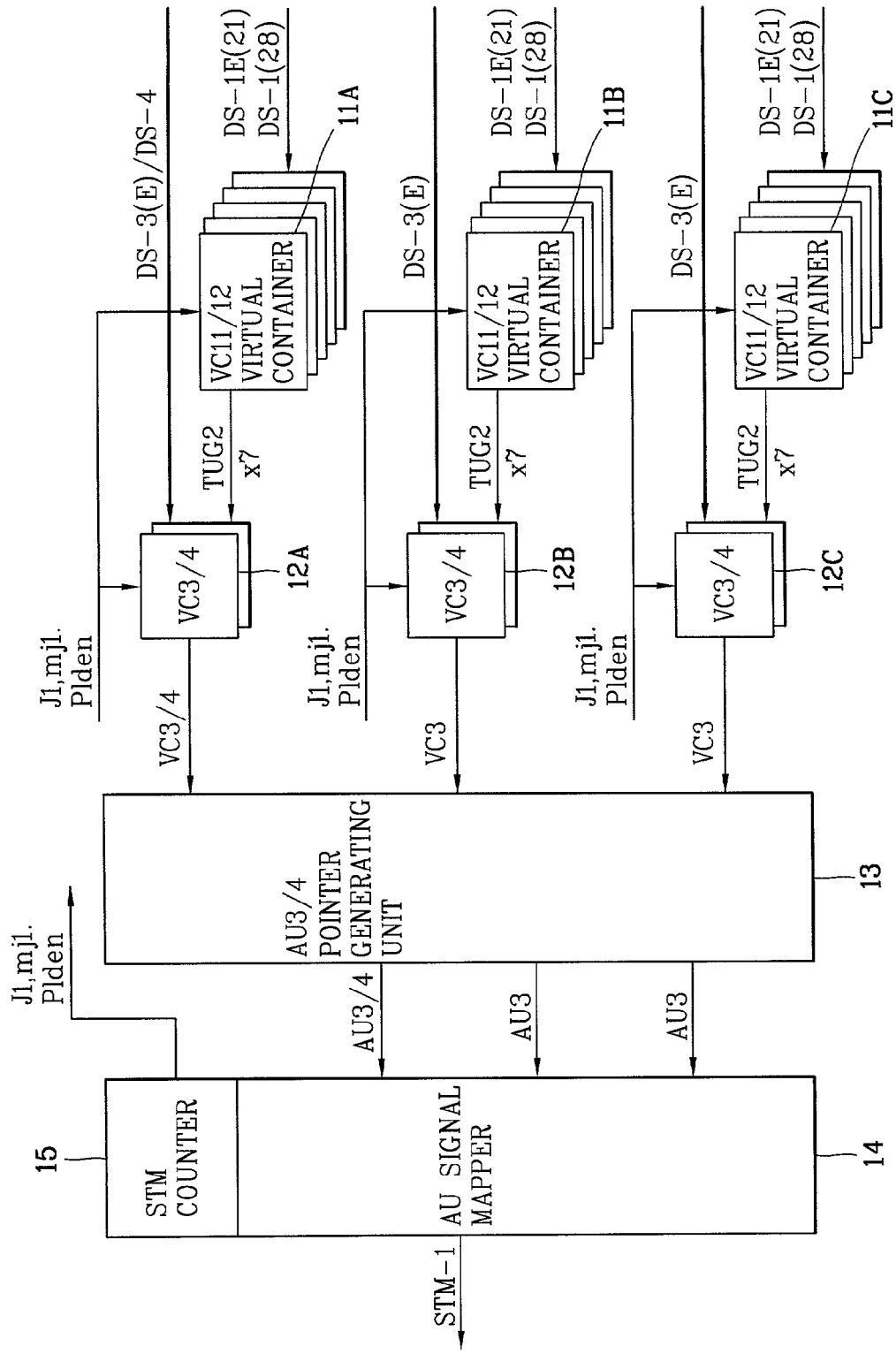
FIG. 1 illustrates a general synchronous digital hierarchy system.
Figure 2:
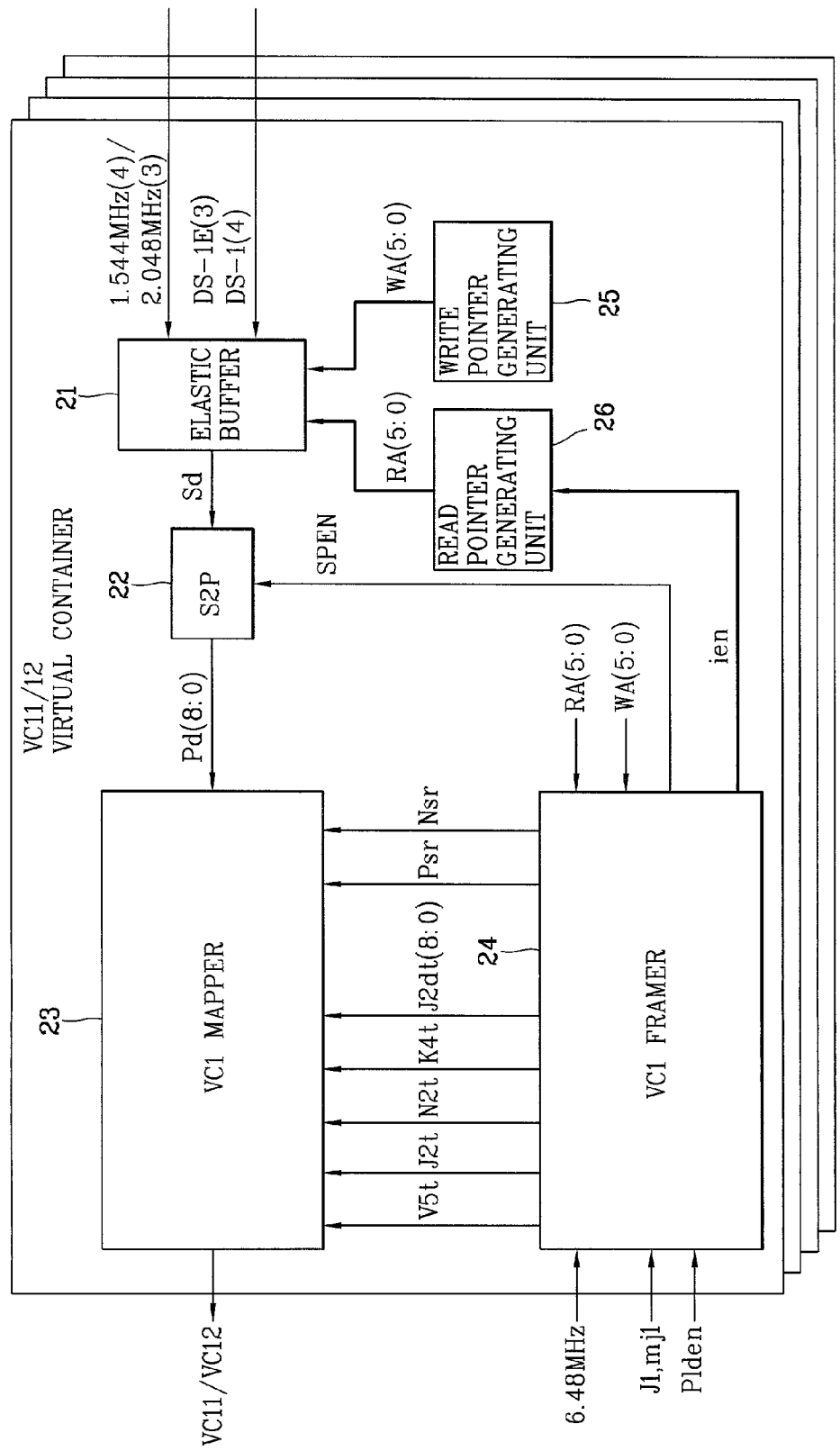
FIG. 2 illustrates a detailed block diagram showing the VC11/12 virtual container in FIG. 1.
Figure 3:
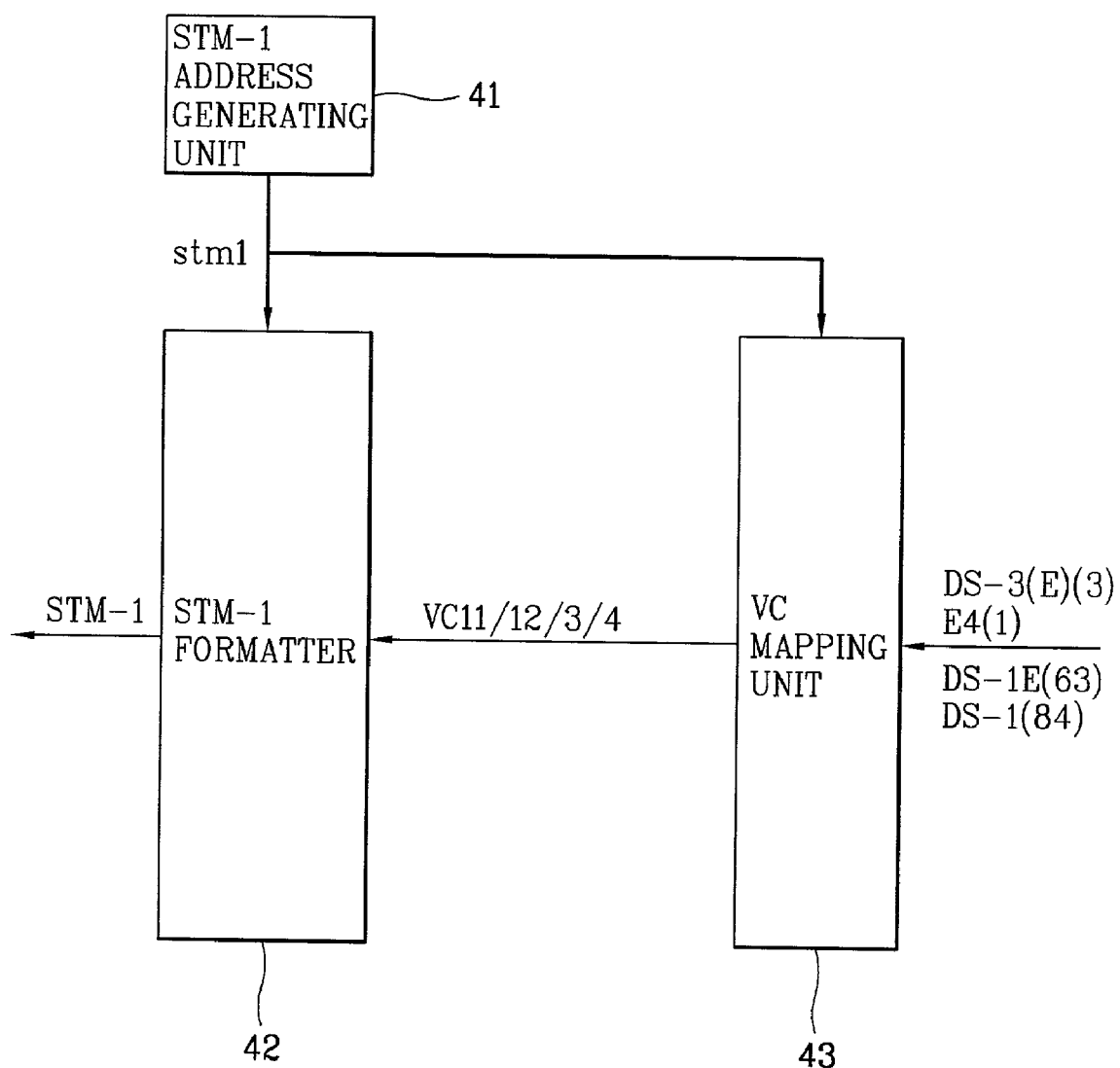
FIG. 3 illustrates a serial data mapping apparatus for a synchronous digital hierarchy system according to the present invention.

FIG. 3 is a block diagram showing a serial data mapping apparatus for a synchronous digital hierarchy system according to a preferred embodiment of the present invention. As shown therein, the serial data mapping apparatus comprises an STM-1 address generating unit 41 generating a mapping address stml indicating a mapping position of new data; a VC mapping unit 43 for mapping the DS asynchronous signals DS-1, DS-1E, DS3E, and DS4E as VC signals VC11, VC12, VC3, and VC4 according to the mapping address stm1; and an STM-1 formatter 42 for pointer processing and multiplexing a virtual container of the VC signal outputted from the VC mapping unit 43 whereby an STM-1 signal is generated.

Figure 4:
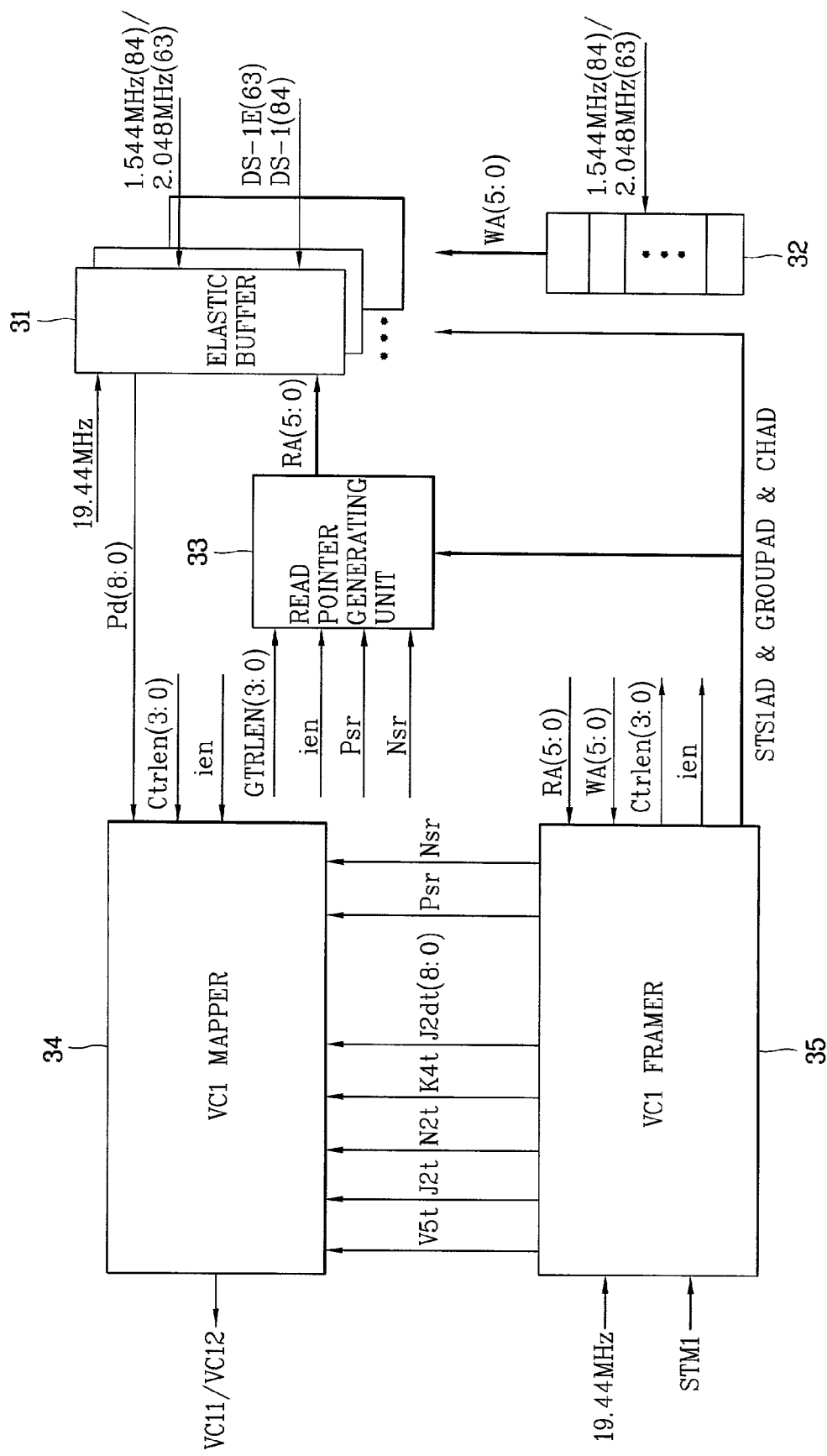
FIG. 4 illustrates a detailed block diagram showing the VC mapping unit in FIG. 3.

As shown in FIG. 4, the VC mapping unit 43 comprises a plurality of elastic buffers 31 for storing the asynchronous DS-1 signal of 84 channels and DS-1E signals of 63 channels; a write pointer generating unit 32 generating write addresses WA of the elastic buffers 31; a read pointer generating unit 33 generating a read address RA of the elastic buffer 31; a VC1 mapper 34 multiplexing parallel asynchronous data Pd of the byte unit, read in the elastic buffers 31, as VC signals VC11/VC12 according to a format controlling signal; and a VC1 framer 35 for identifying the mapping position of asynchronous signals according to the format address stml of the STM-1 address generating unit 41, and controlling operations of the elastic buffers 31, the read pointer generating unit 33, and the VC1 mapper 34 according to the identified mapping position.

When an stm1 address of a format, which will be mapped, is outputted from the STM-1 address generating unit 41, the mapping position of the asynchronous signal is decided by the format address stm1. Once the mapping position is decided, the VC mapping unit 43 performs mapping operations for all asynchronous signals, that is, for 84 channels of DS-1 signals and 63 channels of DS-1E signals collectively. The DS signals are mapped as VC signals VC11, VC12, VC3 and VC4. Therefore, the STM-1 formatter 42 pointer processes and multiplexes the signals VC11, VC12, VC3 and VC4 which are mapped in the VC mapping unit 43 and outputs STM-1 signal.

Hereinafter, the operation of the VC mapping unit 43 will be described in more detail. The inputted 84 channels of DS-1 signals and the 63 channels of DS-1E signals are stored in the plurality of elastic buffers 31 respectively, according to the write address WA outputted from the write pointer generating unit 32. Then, the inputted serial asynchronous signals are synchronized and stored using a system clock signal of 19.44 Mhz, to restrain generation of a jitter. Therefore, the asynchronous signals are written and read in the elastic buffers 31 according to the system clock signal, whereby the jitter generation generated by a difference between the read and write clock signals is reduced.

The VC1 framer 35 chooses one buffer among the 84 elastic buffers 31 and generates sts1/group/channel SONET addresses for controlling the read pointer generating unit 33. Consequendy, a certain elastic buffer 31 is chosen for generating the sts1 /group/channel addresses and the read pointer generating unit 33 generates a read address RA and outputs it to the chosen elastic buffer 31.

That is, the read pointer controlling unit 33 does not read the data as a bit unit from the elastic buffer 31, instead it reads the data a byte unit (8 bit). Accordingly, the read pointer generating unit 33 outputs a read address, that is, a start bit of 8 bit data to the elastic buffer 31. Then the elastic buffer 31 outputs a parallel asynchronous signal of 8 bits according to the start bit. At that time, the read pointer generating unit 33 increases the read address RA by +8 in order to read the next 8 bits of data.

However, in the asynchronous signals stored in the elastic buffers 31, a STUFF bit, that is, Null data is included as well as the data signal. Therefore the read pointer generating unit 33 judges whether the read address RA is increased by +8, +6, or by +4 according to controlling signals Ctrlen and ien outputted from the VC1 framer 35 and after that, generates a start bit of the read address RA of the asynchronous signal which will be read next time.

Also, the read pointer generating unit 33 controls the operation speed of the read pointer generating unit according to controlling signals Psr and Nsr outputted from the VC1 framer 35. That is, the read pointer generating unit 33 increases by +1 or decreases by −1 the operation speed of the read pointer generating unit according to the controlling signals Psr and Nsr, which are designating the difference between the read address RA and the write address WA.

The VC1 framer 35 generates mapping control signals V5t, J2t, N2t, and K4t designating the mapping position of the serial asynchronous signal according to the STM1 format address outputted from the STM-1 address generating unit 41. VC1 framer 35 also controls signals J2dt (8:0), Psr and Nsr indicating an insertion position of the asynchronous data and the Null data periodically. Also, the VC1 framer 35 generates controlling signals Ctrlen and ien for increasing the read address of the elastic buffer 31 by +8, +6, or +4. Therefore, the VC1 mapper 34 multiplexes the parallel asynchronous signal Pd of 8 bits read in the elastic buffer 31, according to the mapping controlling signals V5t, J2t, N2t, K4t, J2dt (8:0), Psr, and Nsr and the controlling signals Ctrlen and ien outputted from the VC1 framer 35, and generates the VC11/VC12 signal.

The asynchronous data stored in the elastic buffers are read and processed as a byte unit and, therefore, there is no need to include the serial/parallel changing unit as in the background art. Also, in order to perform the write operation of the plurality of elastic buffers, there is provided one write pointer generating unit and one read pointer controlling unit, whereby the system can be constructed in simple way.

In addition, the write and the read operations of the elastic buffers are performed by synchronizing with the system clock signal, whereby the jitter, which may be generated by the different frequency of the clock signal in the background art, can be reduced effectively.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A serial data mapping apparatus, comprising:
    an STM-1 address generating unit that generates a mapping address;
    a VC mapping unit that maps a DS asynchronous signal to a VC signal as a byte unit, according to the mapping address; and
    an STM-1 formatter that pointer processes and multiplexes a virtual container of the mapped VC signal and generates an STM-1 signal,
    wherein the VC mapping unit comprises a plurality of elastic buffers that write the DS asynchronous signal as a bit unit and read the DS asynchronous signal as the byte unit comprising a parallel asynchronous signal of 8 bits.

2. The apparatus of claim 1, wherein the VC mapping unit further comprises:
    a write pointer generating unit that generates write addresses for the plurality of elastic buffers;
    a read pointer generating unit that generates read addresses for the plurality of elastic buffers;
    a VC1 mapper that multiplexes parallel asynchronous data of the byte unit, read in the respective elastic buffers, into the VC signal according to a format controlling signal; and
    a VC1 framer that identifies a mapping position of the DS asynchronous signal, according to the mapping address outputted from the STM-1 address generating unit, and controls the elastic buffers, the read pointer generating unit, and the VC1 mapper according to the identified mapping position.

3. The apparatus of claim 1, further comprising:
    a plurality of elastic buffers that write the DS asynchronous signal as a bit unit and read the DS asynchronous signal as the byte unit,
    the plurality of elastic buffers writes the DS asynchronous signal by being synchronized to a system clock signal.

4. The apparatus of claim 2, wherein the read pointer generating unit outputs a start bit of the byte unit as the read address.

5. The apparatus according to claim 4, wherein the read pointer generating unit outputs the read address as increased by +8, +6, or +4 according to the mapping position identified by the VC1 framer.

6. A serial data mapping apparatus, comprising:
    a plurality of elastic buffers, each buffer receiving serial asynchronous data, and outputting parallel data bits as byte units of the asynchronous data;
    a virtual container mapping unit that receives the byte units from the plurality of elastic buffers and maps the byte units to a virtual container signal;
    an STM-1 address generating unit that generates a mapping address;
    a virtual container multiplexer, within the virtual container mapping unit, that multiplexes a number of the byte units received from the plurality of elastic buffers into the virtual container; and
    a virtual container framer that identifies a mapping position of the asynchronous signal, based on the mapping address generated by the STM-1 address generating unit, and controls the multiplexing of the number of byte units into the virtual container.

7. The serial data mapping apparatus of claim 6, further comprising an STM-1 formatter that multiplexes the virtual container signal as an STM-1 signal.

8. The serial data mapping apparatus of claim 6, further comprising a system clock that controls the timing of writing the asynchronous data to the plurality of elastic buffers and reading the parallel data bits from the plurality of elastic buffers to the virtual container mapping unit.

9. The serial data mapping apparatus of claim 6, further comprising:
    an STM-1 formatter that multiplexes the virtual container signal as an STM-1 signal; and
    a read pointer generating unit that generates the read addresses for a plurality of DS-1 signals and a plurality of DS-1E asynchronous signals received by the plurality of elastic buffers, wherein
    the virtual container mapping unit maps portions of the plurality of DS-1 and DS-1E signals into the virtual container signal, and the STM-1 formatter multiplexes the virtual container having the portions of the DS-1 and DS-1E signals into the STM-1 signal.

10. The serial data mapping apparatus of claim 9, further comprising a system clock that controls the timing of writing the asynchronous data to the plurality of elastic buffers and reading the portions of the plurality of DS-1 and DS-1E signals from the elastic buffer to the virtual container mapping unit.

11. A serial data mapping apparatus comprising:
a plurality of elastic buffers, each buffer receiving serial asynchronous data, and outputting parallel data bits of the asynchronous data; and
a virtual container mapping unit that receives the parallel data bits from the plurality of elastic buffers and maps the parallel data bits to a virtual container signal,
wherein the virtual container mapping unit further comprises:
a read pointer generating unit that generates the read addresses for the plurality of elastic buffers, and wherein
the read pointer generating unit generates the read address of a start bit of the parallel data bits,
the read pointer generating unit increments or decrements the read address, after each of a number of the parallel data bits is read from the elastic buffer, by a value of four, six, or eight, and
the value by which the read pointer generating unit is incremented or decremented depends on a number of null bits received in the serial asynchronous data corresponding to the parallel data bits read from the elastic buffer.

12. A method of mapping serial data, comprising:
receiving each of a plurality of serial asynchronous data signals into a plurality of elastic buffers, respectively;
reading a parallel asynchronous signal of 8 bits as a parallel data byte unit;
multiplexing parallel data units read from the plurality of elastic buffers into a virtual container signal;
generating an STM-1 signal from the virtual container signal;
reading the parallel data units from the plurality of elastic buffers, according to generated read addresses; and
writing the plurality of serial asynchronous data signals to the plurality of elastic buffers, according to generated write addresses, wherein a system clock controls the timing of writing the serial asynchronous data to the plurality of elastic buffers and reading the parallel data unit from the plurality of elastic buffers.

13. The method of claim 12, wherein a number of read pointer generating units, which each generate a read address for a number of the respective plurality of elastic buffers, is less than the number of elastic buffers in the plurality of elastic buffers.

14. The method of claim 12, wherein a number of write pointer generating units, which each generate a write address for a number of the respective plurality of elastic buffers, is less than the number of elastic buffers in the plurality of elastic buffers.

* * * * *